United States Patent
Darling

(10) Patent No.: US 10,164,283 B2
(45) Date of Patent: Dec. 25, 2018

(54) FLOW BATTERY WITH ROTATIONALLY SYMMETRIC MANIFOLD PLATES

(71) Applicant: United Technologies Corporation, Farmington, CT (US)

(72) Inventor: Robert Mason Darling, South Windsor, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 132 days.

(21) Appl. No.: 15/109,670

(22) PCT Filed: Jan. 7, 2014

(86) PCT No.: PCT/US2014/010403
§ 371 (c)(1),
(2) Date: Jul. 5, 2016

(87) PCT Pub. No.: WO2015/105476
PCT Pub. Date: Jul. 16, 2015

(65) Prior Publication Data
US 2016/0329590 A1    Nov. 10, 2016

(51) Int. Cl.
H01M 8/18     (2006.01)
H01M 8/20     (2006.01)
H01M 8/0247   (2016.01)

(52) U.S. Cl.
CPC ......... *H01M 8/188* (2013.01); *H01M 8/0247* (2013.01); *H01M 8/20* (2013.01); *Y02E 60/528* (2013.01)

(58) Field of Classification Search
None
See application file for complete search history.

(56) References Cited

U.S. PATENT DOCUMENTS

| | | | | |
|---|---|---|---|---|
| 4,124,478 A | * | 11/1978 | Tsien | B01D 63/082 |
| | | | | 165/166 |
| 5,298,341 A | * | 3/1994 | Khandkar | B01D 53/326 |
| | | | | 429/460 |

(Continued)

FOREIGN PATENT DOCUMENTS

| JP | S54-19228  | 7/1979 |
|----|------------|--------|
| JP | H02-148659 | 6/1990 |

(Continued)

OTHER PUBLICATIONS

International Preliminary Report on Patentability for PCT Application No. PCT/US2014/010403 dated Jul. 21, 2016.

(Continued)

*Primary Examiner* — Basia A Ridley
*Assistant Examiner* — Christopher P Domone
(74) *Attorney, Agent, or Firm* — Carlson, Gaskey & Olds, P.C.

(57) ABSTRACT

A flow battery includes a stack of manifold plates that define first and second exclusive flow circuits through the stack between first and second stack inlets and first and second stack outlets. The manifold plates each include a frame that extends around a flow field of an electrochemically active area, with a plurality of port through-holes in the frame. The through-holes are arranged in a rotationally symmetric pattern about a center of the respective manifold plate.

20 Claims, 3 Drawing Sheets

(56) References Cited

U.S. PATENT DOCUMENTS

| | | | |
|---|---|---|---|
| 5,318,865 | A | 6/1994 | Kaneko et al. |
| 5,648,184 | A | 7/1997 | Inoue et al. |
| 9,166,243 | B2 | 10/2015 | Perry |
| 2008/0274393 | A1 | 11/2008 | Markoski et al. |
| 2008/0292938 | A1 | 11/2008 | Perry et al. |
| 2009/0136789 | A1 | 5/2009 | Pien et al. |
| 2010/0136455 | A1* | 6/2010 | Winter .............. H01M 8/20 429/458 |
| 2012/0208061 | A1 | 8/2012 | Sahu et al. |
| 2013/0154364 | A1 | 6/2013 | Hennessy |

FOREIGN PATENT DOCUMENTS

| | | |
|---|---|---|
| JP | 2006-156029 | 6/2006 |
| WO | 2004079849 | 9/2004 |
| WO | 2012088442 | 6/2012 |

OTHER PUBLICATIONS

File History for U.S. Appl. No. 13/513,651 now U.S. Pat. No. 9,166,243 issued Oct. 20, 2015.

Certified Translation. Japanese Publication of Examined Patent Application No. S52-102887 published Jul. 13, 1979.

Certified Translation. Japanese Unexamined Patent Application No. H2-148659 published Jun. 7, 1990.

Certified Translation. Japanese Unexamined Patent Application No. 2006-156029 published Jun. 15, 1990.

Linden, D. and Reddy, T.B. Eds. (2002). Handbook of batteries. New York, NY: McGraw-Hill. pp. 37.12, 18-23, 42.3-13, 43.11-3, Appendix A.

Laramini, J. and Dicks, A. (2003). Fuel cell systems explained. Chichester, England: John Wiley & Sons Inc. pp. xv, xvi, 18-19, 88-89, 94-96.

Haar, D. (2016). Dan Haar: United Technologies battery could upend the power business. Hartford Courant. Retrieved Feb. 22, 2017 from: http://www.courant.com/business/dan-haar/hc-haar-united-technologies-battery-for-electric-grid-20160523-column.html.

Aricò, A.S., Creti, P., Baglio, V., Modica, E., and Antonucci, V. (2000). Influence of flow field design on the performance of a direct methanol fuel cell. Journal of Power Sources vol. 91. 2000. pp. 202-209.

Li, X. and Sabir, I. (2004). Review of bipolar plates in PEM fuel cells: Flow-field designs. International Journal of Hydrogen Energy vol. 30. 2005. pp. 359-371.

Negishi, A. (2003). Redox flow battery. (Certified Translation). Fuel Cells vol. 2(4). 2003. pp. 69-74.

Yi, J.S., and Nguyen T.V. (1996). Abstract: Hydrodynamics of reactant gas in the electrode of PEM fuel cells with inter-digitated flow fields. The Electrochemical Society, Inc. Meeting Abstracts. Fall Meeting, San Antonio, TX. Oct. 6-11, 1996. p. 974-6.

Kazim, A., Liu, H.T., and Forges, P. (1999). Modelling of performance of PEM fuel cells with conventional and nterdigitated flow fields. Journal of Applied Electrochemistry vol. 29(12). 1999. pp. 1409-1416.

Wang, L. and Liu, H. (2004). Performance studies of PEM fuel cells with interdigitated flow fields. Journal of Power Sources vol. 13(2). 2004. pp. 185-196.

Guo, S.M. (2005). The simulation of a PEMFC with an interdigitated flow field design. Computational Science 5th International Conference. May 2005. pp. 104-111.

He, W., Yi, J.S., Nguyen, T.V. (2000). Two-phase flow model of the cathode of PEM fuel ceels using interdigitated flow fields. AIChE Journal vol. 46(10). Oct. 2000. pp. 2053-2064.

Nozaki, K., Hamamoto, O., Kaneko, H., and Ozawa, T. (1975). (Certified Translation). Prospect of power storage using redox flow type secondary battery. Electrochemical/Electro-thermal Study Group Material. The Institute pf Electrical Engineers of Japan. Nov. 28, 1975. pp. 1-16.

Declaration of Dr. Toru Kato, Ph.D. In re U.S. Pat. No. 9,166,243. Executed Feb. 23, 2017. pp. 1-89.

Prior Art Claim Chart for U.S. Pat. No. 9,166,243.

Ponce de León, C., Frías-Ferrer, A., González-García, Szanto, D.A., and Walsh, F.C. (2006). Redox flow cells for energy conversion. Journal of Power Sources vol. 160. 2006. pp. 716-732.

Negishi, A. (2003). Redox flow battery. Fuel Cells vol. 2(4). 2003. pp. 69-74.

Nozaki, K., Hamamoto, O., Kaneko, H., and Ozawa, T. (1975). Prospect of power storage using redox flow type secondary battery. Electrochemical/Electro-thermal Study Group Material. The Institute of Electrical Engineers of Japan. Nov. 28, 1975. pp. 1-16.

Shigematsu, T. (2011). Redox flow battery for energy storage. SEI Technical Review No. 73. Oct. 2011. pp. 4-13.

Tokuda, N., Kanno, T., Hara, T., Shigematsu, T., Tsutsui, Y., Ikeuchi, A., Itou, T., et al. (2000). Development of a redox flow battery system. SEI Technical Review No. 73. Jun. 2000. pp. 88-94.

Hagedorn, N.H. (1984). NASA redox storage system development project. Final Report. DOE/NASA/12726-24. Oct. 1984. pp. 1-43.

Sumitomo Electric. Redox Flow Battery. Technical Document. Retrieved May 8, 2017 from: http://global-sei.com/products/redox/pdf/redox-flow-battery.pdf.

Petition for Inter Partes Review of U.S. Pat. No. 9,166,243. *Sumitomo Electric Industries, Ltd., Petitioner, v. United Technologies Corporation,* Patent Owner. Filed Feb. 23, 2017.

Skyllas-Kazacos, M., McCann, J., Li, Y., Bao, J., and Tang, A. (2016). The mechanism and modelling of shunt current in the vanadium redox flaw battery. ChemistrySelect 2016, 1, 2249-2256.

International Search Report for PCT Application No. PCT/US2014/010403 completed Apr. 17, 2014.

Supplementary European Search Report for European Patent Application No. 14877972 completed Nov. 17, 2016.

\* cited by examiner

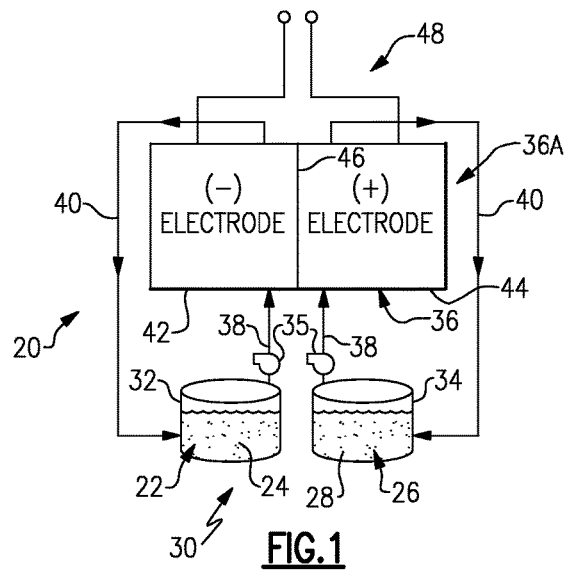
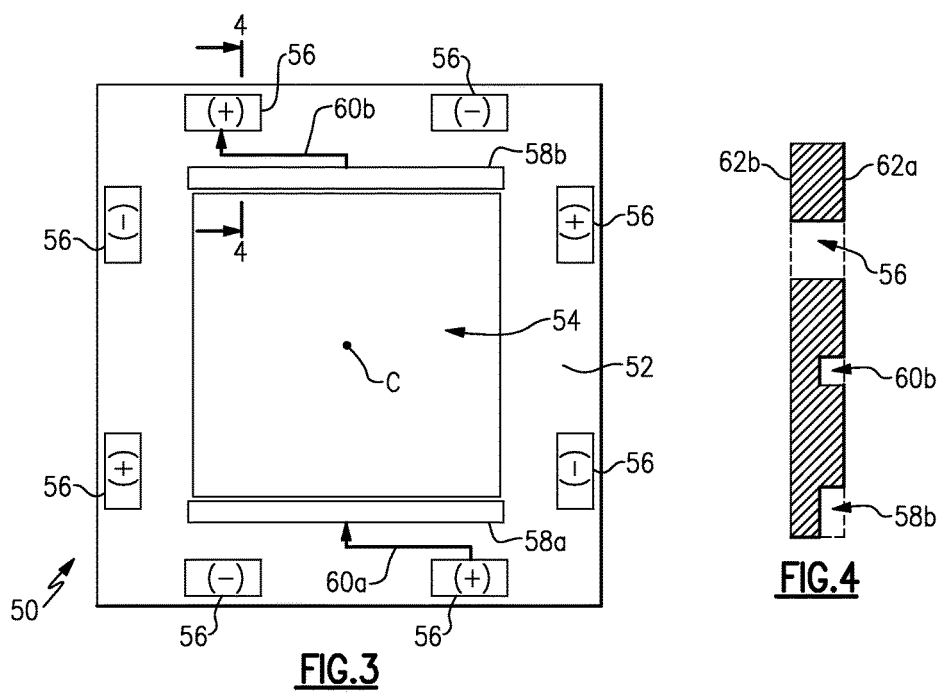

FLOW BATTERY WITH ROTATIONALLY SYMMETRIC MANIFOLD PLATES

BACKGROUND

Flow batteries, also known as redox flow batteries or redox flow cells, are designed to convert electrical energy into chemical energy that can be stored and later released when there is demand. As an example, a flow battery may be used with a renewable energy system, such as a wind-powered system, to store energy that exceeds consumer demand and later release that energy when there is greater demand.

A typical flow battery includes a redox flow cell that has a negative electrode and a positive electrode separated by an electrolyte layer, which may include a separator, such as an ion-exchange membrane. A negative fluid electrolyte (sometimes referred to as the anolyte) is delivered to the negative electrode and a positive fluid electrolyte (sometimes referred to as the catholyte) is delivered to the positive electrode to drive electrochemically reversible redox reactions. Upon charging, the electrical energy supplied causes a chemical reduction reaction in one electrolyte and an oxidation reaction in the other electrolyte. The separator prevents the electrolytes from freely and rapidly mixing but permits selected ions to pass through to complete the redox reactions. Upon discharge, the chemical energy contained in the liquid electrolytes is released in the reverse reactions and electrical energy can be drawn from the electrodes. Flow batteries are distinguished from other electrochemical devices by, inter alia, the use of externally-supplied, fluid electrolyte solutions that include reactants that participate in reversible electrochemical reactions.

SUMMARY

Disclosed is a flow battery that includes a stack of manifold plates defining first and second exclusive flow circuits through the stack between first and second stack inlets and first and second stack outlets. The manifold plates each include a frame that extends around a flow field of an electrochemically active area, with a plurality of port through-holes in the frame. The port through-holes are arranged in a rotationally symmetric pattern about a center of the respective manifold plate.

Also disclosed is a method of assembling a stack for a flow battery. The method includes providing a plurality of manifold plates, each manifold plate including a frame that extends around a flow field of an electrochemically active area, with a plurality of port through-holes in the frame. The port through-holes are arranged in a rotationally symmetric pattern about a center of the respective manifold plate. A first group of the manifold plates is stacked together in a common first orientation and a second group of the manifold plates is stacked together in a common second orientation that is angularly offset from the first orientation. The first and second groups together provide a stack defining first and second exclusive flow circuits through the stack between first and second stack inlets and first and second stack outlets.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 1 illustrates an example flow battery.
FIG. 3 illustrates a representative manifold plate of the cell stack of FIG. 2.
FIG. 4 illustrates a sectioned view of the manifold plate of FIG. 3.

DETAILED DESCRIPTION

Figure 2:
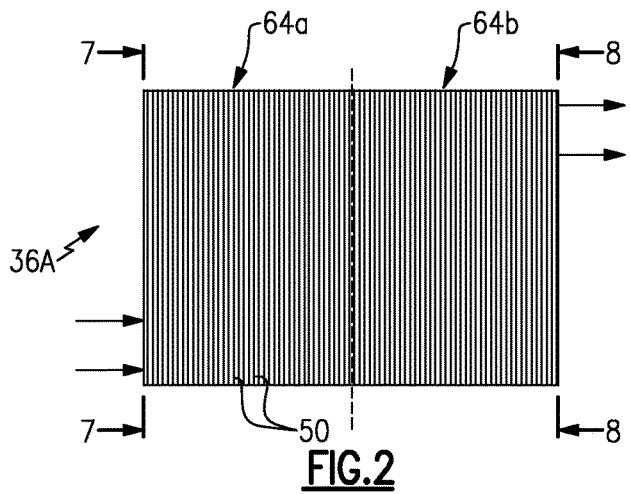
FIG. 2 illustrates an example cell stack of the flow battery of FIG. 1.

FIG. 1 schematically shows portions of an example flow battery 20 for selectively storing and discharging electrical energy. As an example, the flow battery 20 can be used to convert electrical energy generated in a renewable energy system to chemical energy that is stored until a later time when there is greater demand, at which time the flow battery 20 then converts the chemical energy back into electrical energy. The flow battery 20 can supply the electric energy to an electric grid, for example.

The flow battery 20 includes at least one fluid electrolyte 22 (e.g., a first ionic-conductive fluid) that has an electrochemically active specie 24 that undergoes reversible redox reactions. The fluid electrolyte 22 may function in a redox pair with regard to an additional fluid electrolyte 26 (e.g., a second ionic-conductive fluid) that has an electrochemically active specie 28, or it may be coupled with an electrochemically active species, such as oxygen (e.g., air) that is not ionically conductive.

The electrochemically active species 24/28 include ions of elements that have multiple, reversible oxidation states in a selected liquid solution of one or both of the fluid electrolytes 22/26, such as but not limited to aqueous sulfuric acid. In some examples, the multiple oxidation states are non-zero oxidation states, such as for transition metals including but not limited to vanadium, iron, manganese, chromium, zinc, molybdenum and combinations thereof, and other elements including but not limited to sulfur, cerium, lead, tin, titanium, germanium and combinations thereof. In some examples, the multiple oxidation states can include the zero oxidation state as long as the element is readily soluble in the selected liquid solution in the zero oxidation state. Such elements can include the halogens, such as bromine and chlorine, and combinations thereof.

The first fluid electrolyte 22 (e.g., the negative electrolyte) and the second fluid electrolyte 26 (e.g., the positive electrolyte) are contained in a supply/storage system 30 that includes first and second vessels 32/34 and pumps 35. If oxygen or other non-ionically conductive electrochemically active specie is used, the vessel 34 may not be needed. Furthermore, although the examples herein may be described as using, or implied as using, two ionic-conductive liquid electrolytes 22/26, it is to be understood that the examples are also applicable, mutatis mutandis, to the use of one ionic-conductive fluid electrolyte 22 and a non-ionically conductive fluid electrolyte.

The fluid electrolytes 22/26 are delivered from the first and second vessels 32/34, using the pumps 35, to a cell stack 36A of electrochemically active cells 36 (one representative cell schematically shown) of the flow battery 20 through respective feed lines 38. The fluid electrolytes 22/26 are returned from the cell stack 36A to the vessels 32/34 via return lines 40. The feed lines 38 and the return lines 40 connect the vessels 32/34 with the electrochemically active cells 36 of the cell stack 36A. Additional feed lines 38 and return lines 40 can also be used to provide multiple feeds and returns to and from the stack 36A.

The electrochemically active cells 36 each include a first electrode 42, a second electrode 44 spaced apart from the first electrode 42, and an electrolyte separator layer 46 arranged between the first electrode 42 and the second electrode 44. For example, the electrodes 42/44 are porous carbon structures, such as carbon paper or felt. As will also be described, the electrochemically active cells 36 can also include manifold plates, manifolds and the like for delivering the fluid electrolytes 22/26 to the electrodes 42/44. It is to be understood, however, that other configurations can be used. For example, the electrochemically active cells 36 can alternatively be configured for flow-through operation where the fluid electrolytes 22/26 are pumped directly into the electrodes 42/44 without the use of channels. Whether channels or flow-though, the area of the cells 36 are considered to be an electrochemically active "flow field."

The electrolyte separator layer 46 can be an ionic-exchange membrane, an inert micro-porous polymer membrane or an electrically insulating microporous matrix of a material, such as silicon carbide (SiC), that prevents the fluid electrolytes 22/26 from freely and rapidly mixing but permits selected ions to pass through to complete the redox reactions while electrically isolating the electrodes 42/44. In this regard, the fluid electrolytes 22/26 are substantially isolated from each other during normal operation, such as in charge, discharge and shutdown states.

The fluid electrolytes 22/26 are delivered to the electrochemically active cells 36 to either convert electrical energy into chemical energy or, in the reverse reaction, convert chemical energy into electrical energy that can be discharged. The electrical energy is transmitted to and from the electrochemically active cells 36 through an electric circuit 48 that is electrically coupled with the electrodes 42/44.

Unlike fuel cells that typically utilize gaseous, non-ionically-conductive reactants, flow batteries, such as the flow battery 20, utilize at least one ionic-conductive fluid reactant, which can be provided as a liquid solution. Because the ionic-conductive fluid reactant is ionically conductive, the ionic-conductive fluid reactant can undesirably act as a "liquid ionic wire" and conduct leakage currents between locations in a flow battery stack or system that differ in voltage potential. Such leakage currents are also known as shunt currents, which debit energy efficiency of a flow battery. Shunt currents do not typically exist in fuel cells, because gaseous reactants are not ionically conductive. Thus, the phrase "shunt current" as used herein refers to leakage current conducted through an ionic-conductive fluid. As will be described below, the flow battery 20 includes features for reducing shunt currents and, thus, can improve energy efficiency.

FIG. 2 shows a schematic, isolated view of the cell stack 36A. The cell stack 36A is fabricated from a stack of manifold plates 50, one of which is shown in isolation in FIG. 3. The manifold plate 50 of FIG. 3 is representative of all of the manifold plates 50 in the cell stack 36A. In the examples, the manifold plates 50 are fabricated of a non-electrically conductive material. Plastic is one example material of the manifold plates.

The manifold plate 50 includes a frame 52 that extends around a flow field 54, which corresponds to the area of the electrodes 42/44. The frame 52 includes a plurality of port-through holes 56 that are arranged around the frame and about a center, C, of the manifold plate 50. The port-through holes 56 are arranged in a rotationally symmetric pattern about the center, C. In this example, the frame 52 has a square periphery and circumscribes a square interior opening, which receives the electrodes 42/44. Each of the manifold plates 50 includes eight of the port through-holes 56 distributed such that there are two port through-holes 56 on each of four sides of the frame 52. As illustrates, the port through-holes include a "(+)" or "(−)" that indicates transportation of either the positive or negative electrolyte 22/26 there through.

The frame 52 of the manifold plate 50 also includes an inlet manifold 58a and an outlet manifold 58b that border the flow field 54 on opposed sides. In this example, the inlet and outlet manifolds 58a/58b are outside of the active area of the electrodes 42/44, which facilitates gas removal, particularly in horizontal orientations. Alternatively, the inlet and outlet manifolds 58a/58b can be within the active area of the electrodes 42/44. The inlet manifold 58a and the outlet manifold 58b are connected to respective ones of the through-holes 56 via manifold passages 60a and 60b, respectively.

FIG. 4 shows a sectional view according to the section line of FIG. 3 through a portion of the manifold plate 50. As shown, the port through-holes 56 extend completely through the thickness of the manifold plate from a first broad side 62a to an opposed, second broad side 62b. The outlet manifold 58b, inlet manifold 58a and manifold passages 60a/60b extend only partially through the thickness of the manifold plate 50. Thus, in this example, the inlet manifold 58a, the outlet manifold 58b and manifold passage 60b open to the first broad side 62a. The second broad side 62b can include a similar inlet manifold, outlet manifold and manifold passages, with the inlet and outlet manifolds being on the same or other lateral sides of the flow field 54 than the inlet and outlet manifolds 58a/58b.

The port through-holes 56 of the manifold plates 50 are arranged in a rotationally symmetric pattern about the center, C. As used in this disclosure, the term "rotationally symmetric" refers to a symmetry about the center point, C, such that the manifold plate 50, with respect to the port through-holes 56, looks the same after a certain amount of rotation. In this example, the port through-holes 56 are arranged such that the manifold plate would look the same with respect to the port through-holes 56 for every 90 degrees of rotation about the center point, C.

The rotational symmetry of the manifold plates 50 permits one common design of the manifold plate 50 to be used, yet the cell stack 36A can be separated into at least two groups to define first and second exclusive flow circuits through the cell stack 36A. For instance, in the example shown in FIG. 2, a portion of the manifold plates 50 are stacked together in a first group 64a and another portion of the manifold plates 50 are stacked together in a second group 64b, which is back-to-back with the first group 64a.

Figure 6:
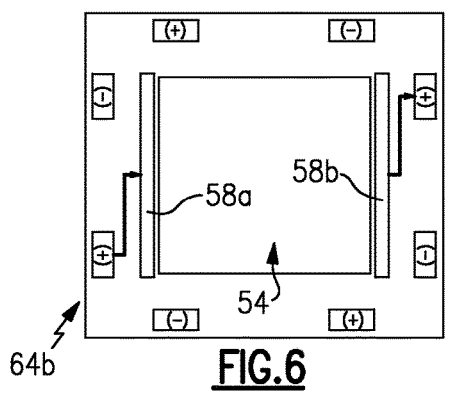
FIG. 6 illustrates the orientation of the manifold plates of a second group of manifold plates of the cell stack of FIG. 2.
Figure 5:
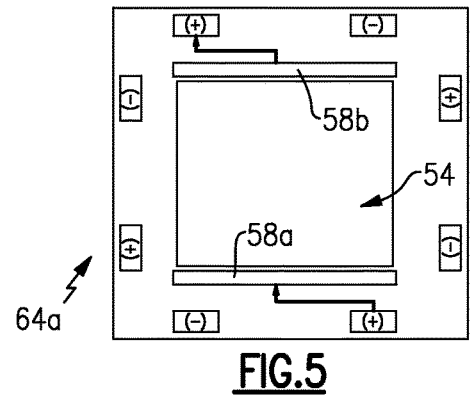
FIG. 5 illustrates the orientation of the manifold plates of a first group of manifold plates of the cell stack of FIG. 2.
Figure 7:
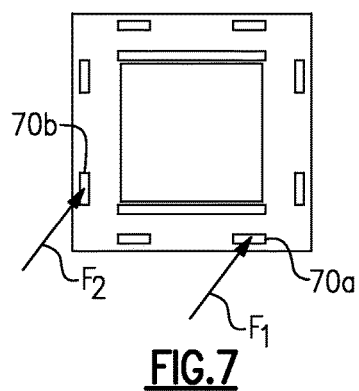
FIG. 7 illustrates an end-on view of the cell stack of FIG. 2.
Figure 8:
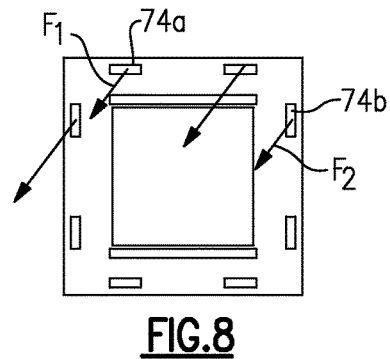
FIG. 8 illustrates an end-on view of the other end of the cell stack of FIG. 2.

In one example, the manifold plates 50 of the first group 64a are oriented as shown in FIG. 5, with the inlet manifold 58a and the outlet manifold 58b on, respectively, the bottom and top of the flow field 54. The manifold plates 50 of the second group 64b are oriented as shown in FIG. 6, with the inlet manifold 58a and the outlet manifold 58b on, respectively, the left and right of the flow field 54. Thus, the manifold plates 50 of the second group 64b are commonly oriented with an angular offset of 90 degrees relative to the orientation of the manifold plates 50 of the first group 64a.

The angular offset between the manifold plates 50 of the first and second groups 64a/64b provides two exclusive (i.e., independent) flow circuits through the stack 36A. The term "exclusive flow circuits" as used herein refers to flow circuits through the cell stack 36A that do not share any common passages and, therefore, fluid flowing through one of the flow circuits does not flow through any passage that is a part of the other of the flow circuits.

With continued reference to FIG. 2, FIGS. 7-10 illustrate the two exclusive flow circuits through the cell stack 36A. In this example, a first flow, $F_1$, is provided through a first inlet 70a into the cell stack 36A and a second flow, $F_2$, is provided through a second inlet 70b into the cell stack 36A. The first flow $F_1$ flows through a first exclusive flow circuit 72a and exits the cell stack 36A through a stack outlet 74a. The second flow $F_2$ flows through a second exclusive flow circuit 72b and exits the cell stack 36A through a stack outlet 74b.

Figure 9:
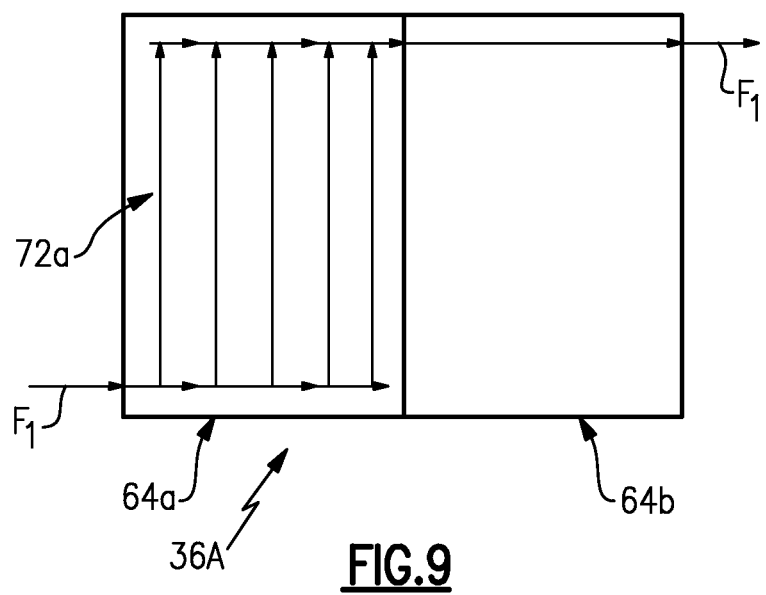
FIG. 9 schematically illustrates a first exclusive flow circuit through the cell stack of FIG. 2.
Figure 10:
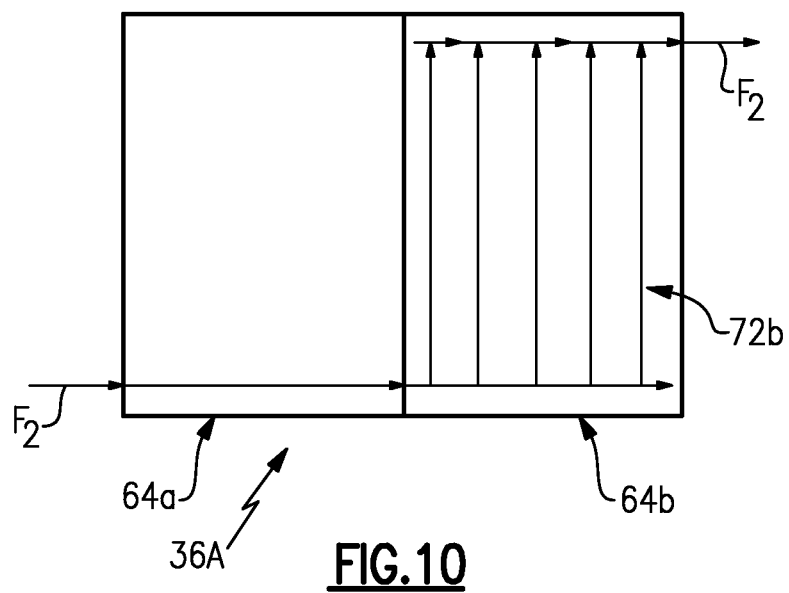
FIG. 10 schematically illustrates a second exclusive flow circuit through the cell stack of FIG. 2.

As shown in FIG. 9, because of the different angular orientations of the manifold plates 50 between the first and second groups 64a/64b, the first flow $F_1$ flows into the manifold plates 50 of the first group 64a and is fed through the respective inlet manifolds, over the flow fields and into the respective outlet manifolds before exiting through the respective port through-holes. However, when the flow $F_1$ exits the first group 64a, it is transported through the aligned port through-holes in the manifold plates 50 of the second group 64b. These port through-holes of the second group 64b are pass-through ports and do not have a manifold for feeding the first flow $F_1$ over their flow fields. Thus, the first flow $F_1$ simply flows through the manifold plates 50 of the second group 64b without flowing over the flow fields of the manifold plates 50 of the second group 64b. The first flow $F_1$ then is discharged through the first stack outlet 70a.

Similarly, before being fed to the manifold plates 50 of the second group 64b, the second flow $F_2$ in a second exclusive flow circuit 72b simply passes through the manifold plates 50 of the first group 64a without flowing over the flow fields of the manifold plates 50 of the first group 64a. The splitting of the cell stack 36A into the two groups 64a/64b that are independently fed reduces the voltage that the fluid electrolytes 22/26 are potentially exposed to because the fluid electrolytes 22/26 are exposed to voltage over only half of the entire cell stack 36A, thus reducing shunt currents that can reduce efficiency. Additionally, the splitting of the cell stack 36A into the two groups 64a/64b that are independently fed is accomplished using the commonly shaped manifold plates 50, which reduces cost and simplifies the structure.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A flow battery comprising:
a stack of manifold plates defining first and second exclusive flow circuits through the stack between first and second stack inlets and first and second stack outlets, the manifold plates each including a frame that extends around a flow field of an electrochemically active area, with a plurality of port through-holes in the frame, the plurality of port through-holes being arranged in a rotationally symmetric pattern about a center of the respective manifold plate, wherein the manifold plates each include an inlet manifold and an exit manifold bordering the flow field, the inlet manifold and the exit manifold fluidly connected with respective ones of the port through-holes of the respective manifold plate.

2. The flow battery as recited in claim 1, wherein the inlet manifold and the exit manifold are on opposed sides of the flow field.

3. The flow field as recited in claim 2, wherein a portion of the manifold plates are stacked together in a first group and another portion of the manifold plates are stacked together in a second group that is angularly offset from an orientation of the first group.

4. The flow battery as recited in claim 3, wherein the manifold plates of the second group are angularly offset by 90 degrees from the manifold plates of the first group.

5. The flow battery as recited in claim 1, wherein the plurality of port through-holes are arranged in a rotationally symmetric pattern by 90 degrees.

6. The flow battery as recited in claim 1, wherein the frame has a square periphery and circumscribes a square interior opening, each of the manifold plates including eight of the port through-holes distributed such that there is two port through-holes in each of four sides of the frame.

7. The flow battery as recited in claim 1, wherein the manifold plates are formed of a non-electrically conductive material.

8. The flow battery as recited in claim 1, further including a supply/storage system external of the stack, the supply/storage system including at least one vessel fluidly connected with the stack; and
fluid electrolytes in the supply/storage system, at least one of the fluid electrolytes being an ionically-conductive fluid.

9. A method of assembling a stack for a flow battery, the method comprising:
providing a plurality of manifold plates, each manifold plate including a frame that extends around a flow field of an electrochemically active area, with a plurality of port through-holes in the frame, the plurality of port through-holes being arranged in a rotationally symmetric pattern about a center of the respective manifold plate; and
stacking together a first group of the manifold plates in a common first orientation and stacking together a second group of the manifold plates in a common second orientation that is angularly offset from the first orientation, the first and second groups together providing a stack defining first and second exclusive flow circuits through the stack between first and second stack inlets and first and second stack outlets; and wherein the manifold plates each include an inlet manifold and an exit manifold bordering the flow field, the inlet manifold and an exit manifold fluidly connected with a portion of the port through-holes of the respective manifold plate.

10. The method as recited in claim 9, wherein the inlet manifold and the exit manifold are on opposed sides of the flow field.

11. The flow battery as recited in claim 1, wherein the inlet manifold and the exit manifold are fluidly connected with a respective ones of the port through-hoes via manifold passages.

12. The flow battery as recited in claim 11, wherein the inlet manifold, the exit manifold, and the manifold passages extend only partially through a thickness of the manifold plate.

13. The flow battery as recited in claim 12, wherein the port through-holes extend through the entire thickness of the manifold plate.

14. The flow battery of claim 4, wherein the angular offset of the first group from the second group provides the first and second exclusive flow circuits.

15. The flow battery of claim 14 further comprising a first flow in the first exclusive flow circuit, the first flow transported over the flow fields of the manifold plates in the first group of manifold plates but not over the flow fields of the manifold plates in the second group of manifold plates due to the angular offset.

16. The flow battery of claim 15, wherein the first flow is transported over the flow fields of the manifold plates in the first group of manifold plates via the inlet manifolds in the first group of manifold plates.

17. The flow battery of claim 15 further comprising a second flow in the second exclusive flow circuit, the second flow transported over the flow fields of the manifold plates in the second group of manifold plates but not over the flow fields of the manifold plates in the first group of manifold plates due to the angular offset.

18. The flow battery of claim 17, wherein the second flow is transported over the flow fields of the manifold plates in the second group of manifold plates via the inlet manifolds in the second group of manifold plates.

19. The flow battery of claim 1, wherein the inlet manifold is configured to provide a flow to the flow field.

20. The flow battery of claim 9, wherein the manifold plates of the second group are angularly offset by 90 degrees from the manifold plates of the first group.

* * * * *